Patented Oct. 25, 1932

1,884,002

UNITED STATES PATENT OFFICE

CHARLES J. LEYES, OF JERSEY CITY, NEW JERSEY

METHOD OF PRODUCING 1,3 BUTADIENE

No Drawing.   Application filed December 28, 1926.   Serial No. 157,628.

My invention relates to the manufacture of 1,3-butadiene and has for its object to provide a method for producing this compound on a large scale at a low cost and in a highly pure condition.

As the parent substance of the butadiene I employ a substituted ethylene compound, such as a halide, sulfide, or oxide, but preferably the halogen substituted compounds known as the vinyl halides, including vinyl chloride, bromide and iodide. These vinyl halides do not give the same reactions with certain well-known reagents that hydrocarbon halides usually do; for instance, they do not give substitution products with potassium hydroxide, sodium ethylate, or sodium acetate, but instead are broken down by these reagents into acetylene and the halogen acid. They differ from other aliphatic hydrocarbon halides also in their tendency to polymerize into white solids (vinyl chloride and bromide are gaseous, while the iodide is a liquid at room temperatures) merely on exposure to sunlight. On heating, these unsaturated compounds, like other vinyl compounds, such as vinyl benzene or styrene, tend to form condensation products whose generation and composition cannot be controlled, and in general the chemical behavior of the vinyl compounds differs radically from that of other substituted hydrocarbons, particularly the saturated hydrocarbons.

I have found that, contrary to what might be expected from the known behavior of vinyl compounds, such as the vinyl halides, sulfides and oxides, they may, under certain conditions, be made to produce the unsaturated hydrocarbon, 1,3-butadiene without the production of appreciable amounts of undesirable compounds such as condensates or polymers of higher or unknown molecular weight. In accordance with the present invention, the reaction forming the subject matter of the present invention is so conducted that two vinyl residues are caused to unite at elevated temperatures in the presence of a metal, the latter combining with the halogen, sulfur, or oxygen of the vinyl compound.

In carrying out my invention, I pass a vinyl compound over or through heated metals, such as iron, copper, lead, tin, bismuth, antimony, cadmium, zinc, at a temperature of from 100–400° C. Only those metals should be employed whose corresponding compounds do not cause polymerization or decomposition of the butadiene, or cause condensation of the vinyl compound into undesirable by-products.

I have found that highly satisfactory results may be obtained by employing vinyl bromide, though the chloride, iodide, sulfide, or oxide may be used. In practice, I prefer to employ a metal, such as tin, which is molten at the temperature of the reaction. The vinyl compound (e. g. bromide) in the form of a gas or vapor is bubbled through a mass of molten tin, the butadiene being drawn off as it is formed. The chemical reaction may be represented as follows:

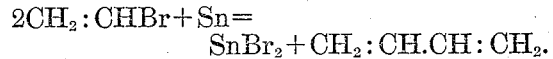

$2CH_2:CHBr + Sn = SnBr_2 + CH_2:CH.CH:CH_2.$

Variations may be resorted to within the scope of the appended claims without departing from the spirit of the invention.

I claim:

1. The method of producing 1,3-butadiene which comprises passing, at a temperature not above 400° C., a vinyl compound selected from the group consisting of the vinyl halides, oxide and sulfide, in contact with a heavy metal.

2. The method of producing 1,3-butadiene which comprises passing, at a temperature of 100–400° C., a vinyl compound selected from the group consisting of the vinyl halides, oxide and sulfide, which is in contact with a heavy metal fluid at the temperature of the reaction.

3. The method of producing 1,3-butadiene which comprises passing, at a temperature of 100–400° C., vinyl bromide in contact with a heavy metal.

4. The method of producing 1,3-butadiene which comprises passing a vinyl compound selected from the group consisting of the vinyl halides, oxide and sulfide, through a bath of molten metal whose temperature is not above 400° C., and whose corresponding compound is fluid at the temperature of the reaction.

5. The method of producing 1,3-butadiene which comprises passing a vinyl compound selected from the group consisting of the vinyl halides, oxide and sulfide, through a bath of molten tin at a temperature not above 400° C.

6. The method of producing 1,3-butadiene which comprises passing a vinyl halide through a bath of molten tin at a temperature not above 400° C.

In testimony whereof, I have signed my name to this specification this 21st day of December, 1926.

CHARLES J. LEYES.